(12) United States Patent
Tu

(10) Patent No.: US 11,092,837 B2
(45) Date of Patent: Aug. 17, 2021

(54) DISPLAY DEVICE WITH UNDER-SCREEN FINGERPRINT IDENTIFICATION HAVING A BACKLIGHT SOURCE

(71) Applicant: Egis Technology Inc., Taipei (TW)

(72) Inventor: Chih-Chung Tu, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 16/691,577

(22) Filed: Nov. 21, 2019

(65) Prior Publication Data

US 2020/0409197 A1 Dec. 31, 2020

Related U.S. Application Data

(60) Provisional application No. 62/866,643, filed on Jun. 26, 2019.

(30) Foreign Application Priority Data

Oct. 9, 2019 (CN) .......................... 201910952582.6

(51) Int. Cl.
*G02F 1/1333* (2006.01)
*G02F 1/1335* (2006.01)
*G02F 1/13357* (2006.01)
*G06K 9/00* (2006.01)

(52) U.S. Cl.
CPC .... *G02F 1/13338* (2013.01); *G02F 1/133528* (2013.01); *G02F 1/133617* (2013.01); *G06K 9/0004* (2013.01); *G02F 2202/36* (2013.01)

(58) Field of Classification Search
CPC combination set(s) only.
See application file for complete search history.

(56) References Cited

U.S. PATENT DOCUMENTS

2011/0248155 A1* 10/2011 Chen ................... H01L 27/3234
250/226
2012/0328170 A1* 12/2012 Wu ..................... G06K 9/00046
382/124
2017/0124376 A1* 5/2017 Wyrwas ............... G06K 9/2018

FOREIGN PATENT DOCUMENTS

CN 108565279 9/2018
TW 201834295 9/2018

* cited by examiner

*Primary Examiner* — Lauren Nguyen
(74) *Attorney, Agent, or Firm* — JCIPRNET

(57) ABSTRACT

The invention provides a display device with under-screen fingerprint identification, including a backlight source, a display panel, and an image sensor. The backlight source is configured to emit an original beam. The display panel includes a first substrate, a second substrate, a display medium layer, and pixel structures. The pixel structures are distributed on the second substrate, and each of the pixel structures includes quantum dot sub-pixel layers emitting light of different colors. After the original beam is irradiated to the quantum dot sub-pixel layers, beams of different colors are respectively formed. One of the beams of different colors is a fingerprint sensing beam. The fingerprint sensing beam is reflected by a finger back to the second substrate after passing through the second substrate, and sequentially penetrates the display panel and the backlight source to be sensed by the image sensor.

10 Claims, 3 Drawing Sheets

DISPLAY DEVICE WITH UNDER-SCREEN FINGERPRINT IDENTIFICATION HAVING A BACKLIGHT SOURCE

CROSS-REFERENCE TO RELATED APPLICATION

This application claims the priority benefits of U.S. provisional application Ser. No. 62/866,643, filed on Jun. 26, 2019, and China application serial no. 201910952582.6, filed on Oct. 9, 2019. The entirety of each of the above-mentioned patent applications is hereby incorporated by reference herein and made a part of this specification.

BACKGROUND OF THE INVENTION

Field of the Invention

The disclosure relates to a biometrics identification device, and in particular, to a display device with under-screen fingerprint identification.

Description of Related Art

As a hand-held electronic device develops toward a full screen, the original fingerprint identification solution of disposing a fingerprint identification device on the front of an electronic device needs to be changed. In some fingerprint identification solutions, the fingerprint identification device is disposed on the back of the electronic device. However, this kind of fingerprint identification solution cannot be used when the electronic device is placed on the desk.

In this case, under-screen fingerprint identification is developed. Two types of solutions are generally adopted in under-screen fingerprint identification, including the ultrasonic solution and the optical solution. The ultrasonic solution of under-screen fingerprint identification incurs high costs and has a low production yield. In the traditional optical solution of under-screen fingerprint identification, an organic light-emitting diode panel is generally used. The organic light-emitting diode panel is more likely to allow reflected light from a fingerprint to penetrate through and to transmit to an image sensor under the organic light-emitting diode panel. However, in electronic devices adopting a liquid crystal display panel, the liquid crystal panel itself does not emit light and needs to be illuminated by a backlight module. In that case, the light from the backlight module needs to pass through multiple optical film layers before it reaches the finger. Also, the light reflected by the finger needs to pass through multiple optical film layers before it reaches the image sensor disposed under the backlight module. As a result, the fingerprint sensing effect is poor. Moreover, the color filter layer in the liquid crystal display panel filters out the light used to illuminate the finger, which thus affects the fingerprint identification quality.

SUMMARY OF THE INVENTION

The invention relates to a display device with under-screen fingerprint identification which exhibits good fingerprint identification effect.

According to an embodiment of the invention, a display device with under-screen fingerprint identification includes a backlight source, a display panel, and an image sensor. The backlight source is configured to emit an original beam, and the display panel is disposed on the backlight source. The display panel includes a first substrate, a second substrate, a display medium layer, and a plurality of pixel structures. The first substrate is disposed between the backlight source and the second substrate, and the display medium layer is disposed between the first substrate and the second substrate. The pixel structures are distributed on the second substrate, and each of the pixel structures includes a plurality of quantum dot sub-pixel layers emitting light of different colors. After the original beam is irradiated to the quantum dot sub-pixel layers emitting light of different colors, a plurality of beams of different colors is respectively formed. The backlight source is disposed between the display panel and the image sensor, and one of the beams of different colors is a fingerprint sensing beam. The fingerprint sensing beam is reflected by a finger back to the second substrate after passing through the second substrate, and sequentially penetrates the display panel and the backlight source to be sensed by the image sensor.

In the display device with under-screen fingerprint identification of the embodiments of the invention, the original beam is used to excite the quantum dot sub-pixel layers, and the original beam penetrates the transparent sub-pixel layer to generate the light for illuminating the finger and the light for displaying the image. Therefore, the light illuminating the finger may have a relatively short travel distance and may not pass through a color filter. In this way, the image sensor can have better sensing effect, thereby improving the success rate and accuracy of fingerprint identification.

BRIEF DESCRIPTION OF THE DRAWINGS

The accompanying drawings are included to provide a further understanding of the invention, and incorporated in and constitute a part of this specification. The drawings illustrate embodiments of the invention and, together with the description, serve to explain the principles of the invention.

DESCRIPTION OF THE EMBODIMENTS

Figure 1A:
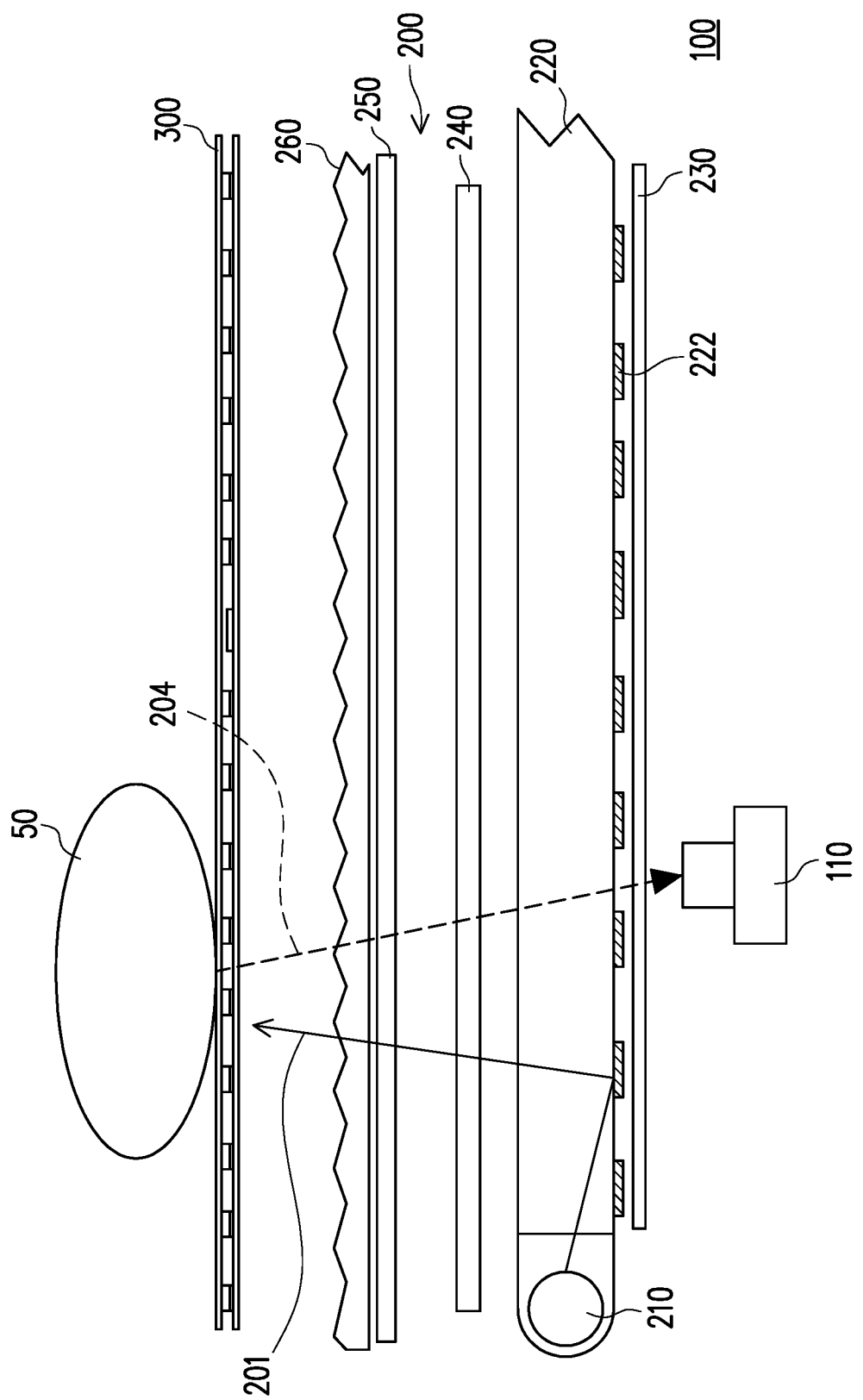
FIG. 1A is a schematic cross-sectional view of a display device with under-screen fingerprint identification according to an embodiment of the invention.

Exemplary embodiments of the invention are described in detail, and examples of the exemplary embodiments are shown in the accompanying drawings. Whenever possible, the same component symbols are used in the drawings and descriptions to indicate the same or similar parts.

Figure 1B:
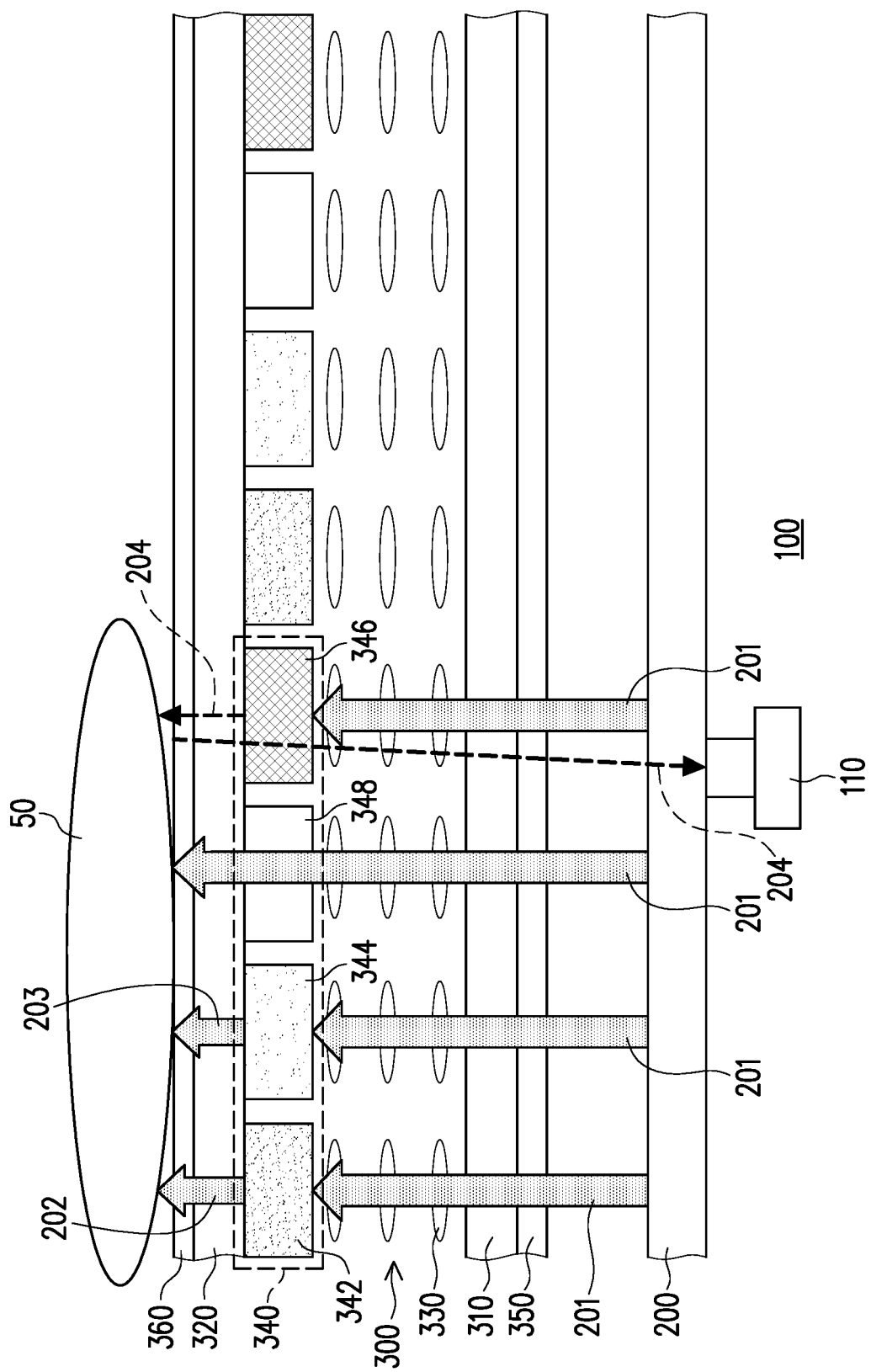
FIG. 1B is a schematic diagram of a specific structure of a portion of the display device with under-screen fingerprint identification in FIG. 1A.

FIG. 1A is a schematic cross-sectional view of a display device with under-screen fingerprint identification according to an embodiment of the invention, and FIG. 1B is a schematic diagram of a specific structure of a portion of the display device with under-screen fingerprint identification in FIG. 1A. Referring to FIG. 1A and FIG. 1B, the display device 100 with under-screen fingerprint identification of the present embodiment includes a backlight source 200, a display panel 300, and an image sensor 110. The backlight source 200 is configured to emit an original beam 201, and the display panel 300 is disposed on the backlight source 200. Referring to FIG. 1A first, in the present embodiment, the backlight source 200 is, for example, an edge backlight module. However, in other embodiments, the backlight source may also be a direct backlight module.

Referring to FIG. 1A first, in the present embodiment, the backlight source 200 includes a light-emitting diode 210. In addition, in the present embodiment, the backlight source 200 further includes an optical film disposed on a path of light emitted by the light-emitting diode 210. The optical film may include a diffuser, a brightness enhancement film, or a combination thereof. In the present embodiment, the optical film includes a diffuser 240, a brightness enhancement film 250, and a brightness enhancement film 260 as an example. In the present embodiment, the backlight source 200 further includes a light guide plate 220 and a reflection sheet 230 disposed below the light guide plate 220. After light emitted through a side surface of the light guide plate 220 by the light-emitting diode 210 is scattered upward by an optical microstructure 222 on a surface of the light guide plate 220 and the reflection sheet 230, the light penetrates the diffuser 240, the brightness enhancement film 250, and the brightness enhancement film 260 to form the original beam 201. In the present embodiment, the light-emitting diode 210 is, for example, a blue light-emitting diode, which emits a blue light that is to be reflected by the reflection sheet 230. A beam 204 (for example, an infrared beam or a beam different from the blue beam) from a finger 50 can penetrate the reflection sheet 230 to be transmitted to the image sensor 110 below the reflection sheet 230. Alternatively, in other embodiments, the reflection sheet 230 may have an opening right above the image sensor 110 for the beam 204 to pass through.

Further referring to FIG. 1B, the display panel 300 includes a first substrate 310, a second substrate 320, a display medium layer 330, and a plurality of pixel structures 340. The first substrate 310 is disposed between the backlight source 200 and the second substrate 320, and the display medium layer 330 is disposed between the first substrate 310 and the second substrate 320. The pixel structures 340 are distributed on the second substrate 320, each of the pixel structures 340 including a plurality of quantum dot sub-pixel layers 342, 344, and 346 emitting light of different colors. After the original beam 201 is irradiated to the quantum dot sub-pixel layers 342, 344, and 346 emitting light of different colors, a plurality of beams 202, 203, and 204 of different colors is respectively formed.

The backlight source 200 is disposed between the display panel 300 and the image sensor 110, and one of the beams 202, 203, and 204 (for example, the beam 204) of different colors is a fingerprint sensing beam. The fingerprint sensing beam (for example, the beam 204) is reflected by the finger 50 back to the second substrate 320 after passing through the second substrate 320, and sequentially penetrates the display panel 300 and the backlight source 200 to be sensed by the image sensor 110.

In the present embodiment, each of the pixel structures 340 further includes a transparent sub-pixel layer 348, and the original beam 201 penetrates the second substrate 320 after penetrating the transparent sub-pixel layer 348. In particular, in the present embodiment, the original beam 201 is a blue beam, and the quantum dot sub-pixel layers emitting light of different colors include a red-light quantum dot sub-pixel layer 342, a green-light quantum dot sub-pixel layer 344, and an infrared-light quantum dot sub-pixel layer 346, and the fingerprint sensing beam (for example, the beam 204) is an infrared beam. The original beam 201 excites the red-light quantum dot sub-pixel layer 342, the green-light quantum dot sub-pixel layer 344, and the infrared-light quantum dot sub-pixel layer 346 to respectively generate the beam 202 (that is, a red beam), the beam 203 (that is, a green beam), and the beam 204 (that is, an infrared beam). In addition, the original beam 201 (that is, the blue beam) penetrates the second substrate 320 after penetrating the transparent sub-pixel layer 348. The original beam 201 (that is, the blue beam), the beam 202 (that is, the red beam) and the beam 203 (that is, the green beam) form a color image that passes through the second substrate 320 to be transmitted to eyes of a user, and the beam 204 (that is, the infrared beam) is used as a fingerprint sensing beam to illuminate a fingerprint.

In the display device 100 with under-screen fingerprint identification of the present embodiment, the original beam 201 is used to excite the quantum dot sub-pixel layers 342, 344, and 346, and the original beam 201 penetrates the transparent sub-pixel layer 348 to generate a light for illuminating the finger 50 and a light for displaying the image. Therefore, the light for illuminating the finger 50 may have a relatively short travel distance and may not pass through a color filter. In this way, the image sensor 110 can have better sensing effect, thereby improving the success rate and accuracy of fingerprint identification.

In the present embodiment, the display medium layer 330 is a liquid crystal layer (that is, the display panel 300 is a liquid crystal display panel), and the display device 100 with under-screen fingerprint identification provides a solution of under-screen fingerprint identification for the liquid crystal display panel.

In the present embodiment, the display panel 300 further includes a first polarizer 350 and a second polarizer 360. The first polarizer 350 is disposed on the first substrate 310, and the second polarizer 360 is disposed on the second substrate 320. In addition, the display panel 300 may further include some common film layers in the liquid crystal display panel, for example, an alignment film respectively disposed on inner sides of the first substrate 310 and the second substrate 320, a thin film transistor array and a pixel electrode layer disposed on the first substrate 310, a common electrode layer disposed on the second substrate 320, and the like, which are well known to those skilled in the art, and are therefore not listed in detail herein. However, in other embodiments, the display medium layer 330 may also be an electrophoretic layer and the display panel 300 may be an electrophoretic display.

Figure 2:
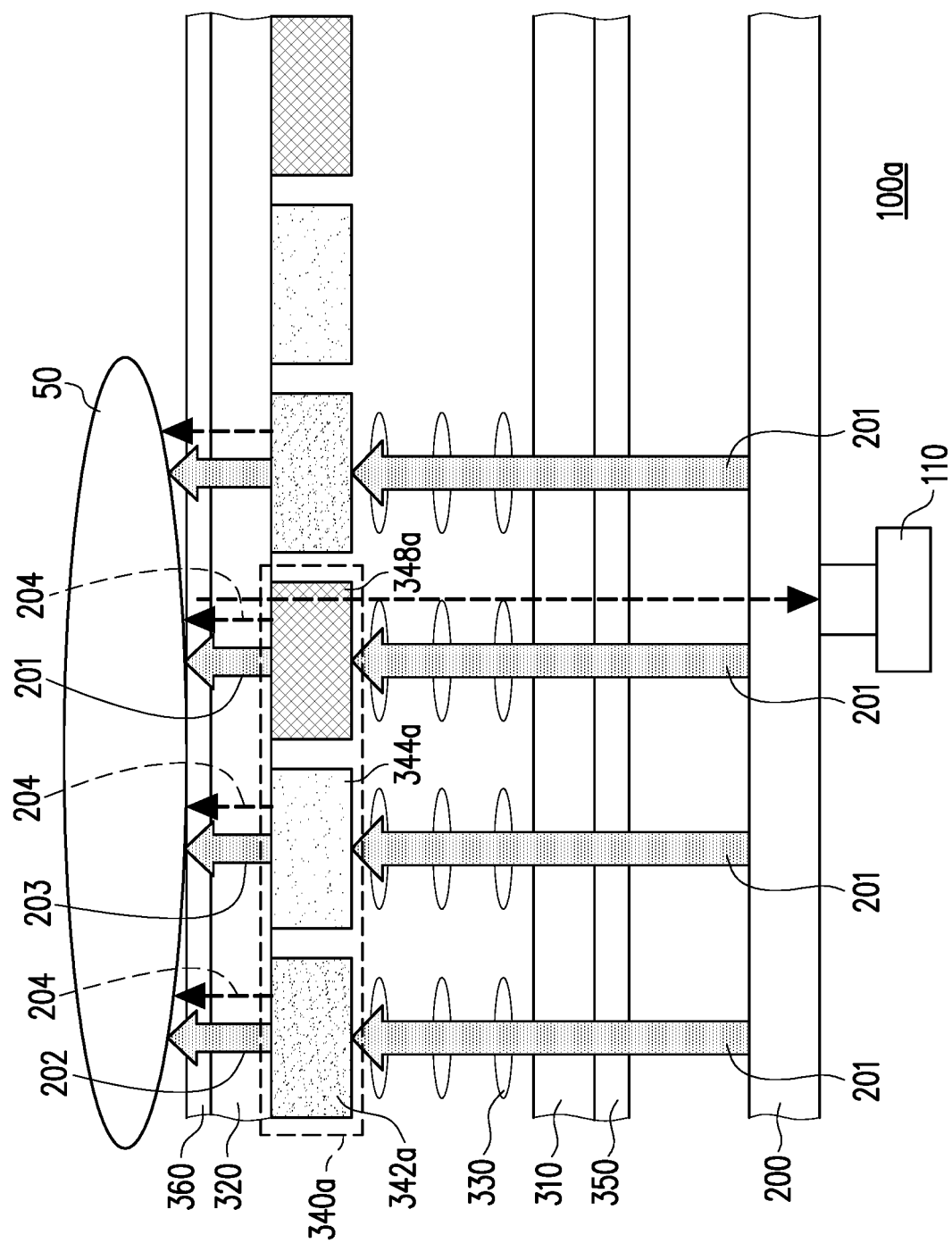
FIG. 2 is a schematic diagram of a specific structure of a portion of a display device with under-screen fingerprint identification according to another embodiment of the invention.

FIG. 2 is a schematic diagram of a specific structure of a portion of a display device with under-screen fingerprint identification according to another embodiment of the invention. Referring to FIG. 2, the display device 100a with under-screen fingerprint identification in the present embodiment is similar to the display device 100 with under-screen fingerprint identification in FIG. 1A and FIG. 1B, and a difference therebetween is as follows. In the display device 100a with under-screen fingerprint identification in the present embodiment, each of a portion of a plurality of quantum dot sub-pixel layers 342a, 344a, and 348a (for example, the quantum dot sub-pixel layers 342a and 344a) includes quantum dots emitting light of two colors, and one emitted color of the quantum dots emitting light of two colors is a color of the foregoing fingerprint sensing beam (that is, the beam 204).

In particular, in the present embodiment, the original beam 201 is a blue beam, the quantum dot sub-pixel layers emitting light of different colors include a sub-pixel layer 342a including a mixture of red-light quantum dots and infrared-light quantum dots, a sub-pixel layer 344a including a mixture of green-light quantum dots and infrared-light quantum dots, and an infrared-light quantum dot sub-pixel layer 348a, and the fingerprint sensing beam (that is, the beam 204) is an infrared beam. A portion of the blue beam (that is, the original beam 201) penetrates the infrared-light quantum dot sub-pixel layer 348a, and another portion of the blue beam (that is, the original beam 201) excites the infrared-light quantum dot sub-pixel layer 348a to form an infrared beam.

In other words, when the original beam 201 is irradiated to the sub-pixel layer 342a including the mixture of the red-light quantum dots and the infrared-light quantum dots, a red light and an infrared light are excited, or when the original beam 201 is irradiated to the sub-pixel layer 344a including the mixture of the green-light quantum dots and the infrared-light quantum dots, a green light and an infrared light are excited, or when the original beam 201 is irradiated to the infrared-light quantum dot pixel layer 348a, a portion of the original beam 201 (blue light) penetrates the infrared-light quantum dot sub-pixel layer 348a, and another portion of the original beam 201 excites the infrared-light quantum dots in the infrared-light quantum dot sub-pixel layer 348a to generate an infrared light. In this way, red, green, and blue light from pixel structures 340a can form a color image, and the infrared light from the pixel structures 340a can form a fingerprint sensing beam.

The display device 100a with under-screen fingerprint identification in the present embodiment has advantages and effects similar to those of the display device 100 with under-screen fingerprint identification in FIG. 1A and FIG. 1B, and the descriptions thereof are omitted herein.

Based on the foregoing, in the display device with under-screen fingerprint identification of the embodiments of the invention, the original beam is used to excite the quantum dot sub-pixel layers, and the original beam penetrates the transparent sub-pixel layer to generate the light for illuminating the finger and the light for displaying the image. Therefore, the light for illuminating the finger may have a relatively short travel distance and may not pass through a color filter. In this way, the image sensor can have better sensing effect, thereby improving the success rate and accuracy of fingerprint identification.

It should be finally noted that the above embodiments are merely intended for describing the technical solutions of the invention other than limiting the invention. Although the invention is described in detail with reference to the foregoing embodiments, persons of ordinary skill in the art should understand that they can still make modifications to the technical solutions described in the foregoing embodiments or make equivalent substitutions to some technical features thereof, without departing from scope of the technical solutions of the embodiments of the invention.

What is claimed is:

1. A display device with under-screen fingerprint identification, comprising:
    a backlight source configured to emit an original beam;
    a display panel disposed on the backlight source and comprising:
        a first substrate;
        a second substrate, wherein the first substrate is disposed between the backlight source and the second substrate;
        a display medium layer disposed between the first substrate and the second substrate; and
        a plurality of pixel structures distributed on the second substrate, wherein each of the plurality of pixel structures comprises a plurality of quantum dot sub-pixel layers emitting light of different colors, and after the original beam is irradiated to the plurality of quantum dot sub-pixel layers emitting light of different colors, a plurality of beams of different colors is respectively formed; and
    an image sensor, wherein the backlight source is disposed between the display panel and the image sensor, one of the plurality of beams of different colors is a fingerprint sensing beam, and the fingerprint sensing beam is reflected by a finger back to the second substrate after passing through the second substrate, and sequentially penetrates the display panel and the backlight source to be sensed by the image sensor.

2. The display device with under-screen fingerprint identification according to claim 1, wherein each of a portion of the plurality of quantum dot sub-pixel layers comprises quantum dots emitting light of two colors, and one emitted color of the quantum dots emitting light of two colors is a color of the fingerprint sensing beam.

3. The display device with under-screen fingerprint identification according to claim 1, wherein each of the plurality of pixel structures further comprises a transparent sub-pixel layer, and the original beam penetrates the second substrate after penetrating the transparent sub-pixel layer.

4. The display device with under-screen fingerprint identification according to claim 1, wherein the original beam is a blue beam, the plurality of quantum dot sub-pixel layers emitting light of different colors comprises a red-light quantum dot sub-pixel layer, a green-light quantum dot sub-pixel layer, and an infrared-light quantum dot sub-pixel layer, the fingerprint sensing beam is an infrared beam, each of the plurality of pixel structures further comprises a transparent sub-pixel layer, and the blue beam penetrates the second substrate after penetrating the transparent sub-pixel layer.

5. The display device with under-screen fingerprint identification according to claim 1, wherein the original beam is a blue beam, the plurality of quantum dot sub-pixel layers emitting light of different colors comprises a sub-pixel layer comprising a mixture of red-light quantum dots and infrared-light quantum dots, a sub-pixel layer comprising a mixture of green-light quantum dots and infrared-light quantum dots, and an infrared-light quantum dot sub-pixel layer, and the fingerprint sensing beam is an infrared beam, wherein a portion of the blue beam penetrates the infrared-light quantum dot sub-pixel layer, and another portion of the blue beam excites the infrared-light quantum dot sub-pixel layer to form an infrared beam.

6. The display device with under-screen fingerprint identification according to claim 1, wherein the display medium layer is a liquid crystal layer.

7. The display device with under-screen fingerprint identification according to claim 1, wherein the backlight source comprises a light-emitting diode.

8. The display device with under-screen fingerprint identification according to claim 7, wherein the backlight source further comprises an optical film disposed on a path of light emitted by the light-emitting diode.

9. The display device with under-screen fingerprint identification according to claim 8, wherein the optical film comprises a diffuser, a brightness enhancement film, or a combination thereof.

10. The display device with under-screen fingerprint identification according to claim 1, wherein the display panel further comprises:
    a first polarizer disposed on the first substrate; and
    a second polarizer disposed on the second substrate.

* * * * *